(12) United States Patent
Liu et al.

(10) Patent No.: US 11,666,954 B1
(45) Date of Patent: Jun. 6, 2023

(54) ENZYMATIC HYDROLYSIS DEVICE FOR LIVESTOCK AND POULTRY SLAUGHTER BY-PRODUCTS

(71) Applicant: Northeast Agricultural University, Harbin (CN)

(72) Inventors: Qian Liu, Harbin (CN); Yangyang Feng, Harbin (CN); Baohua Kong, Harbin (CN); Fangda Sun, Harbin (CN); Jianchun Han, Harbin (CN); Xiufang Xia, Harbin (CN); Hongwei Zhang, Harbin (CN); Haotian Liu, Harbin (CN); Chuanai Cao, Harbin (CN); Liuyang Shen, Harbin (CN)

(73) Assignee: Northeast Agricultural University, Harbin (CN)

( * ) Notice: Subject to any disclaimer, the term of this patent is extended or adjusted under 35 U.S.C. 154(b) by 0 days.

(21) Appl. No.: 18/078,564

(22) Filed: Dec. 10, 2022

(30) Foreign Application Priority Data

Mar. 7, 2022 (CN) ........................ CN202210216976

(51) Int. Cl.
*B09B 3/60* (2022.01)
*B09B 3/35* (2022.01)
(Continued)

(52) U.S. Cl.
CPC ................ *B09B 3/60* (2022.01); *A22B 7/008* (2013.01); *B09B 3/35* (2022.01); *B09B 3/38* (2022.01); *B09B 2101/70* (2022.01)

(58) Field of Classification Search
CPC .... B09B 3/35; B09B 3/38; B09B 3/60; B09B 2101/70; A22B 7/008; B02C 23/20
See application file for complete search history.

(56) References Cited

U.S. PATENT DOCUMENTS 5,113,755 A * 5/1992 Anderson ............... A23J 3/341
99/485
5,451,523 A 9/1995 Von
(Continued)

FOREIGN PATENT DOCUMENTS

CN 207385559 A 5/2018
CN 207614901 U 7/2018
(Continued)

*Primary Examiner* — Joseph C Rodriguez
(74) *Attorney, Agent, or Firm* — Stuart H. Mayer; Mayer & Williams PC (57) ABSTRACT

Disclosed is an enzymatic hydrolysis device for livestock and poultry slaughter by-products, including a feeding barrel, and a crushing box is fixed and communicated with a bottom end of the feeding barrel; two symmetrically arranged rolling plates are arranged in the feeding barrel, and a rolling space is arranged between the two rolling plates, and a bottom of the rolling space is provided with a bearing plate; an air pump is fixed at a bottom of the crushing box; and a mixing disturbance mechanism, including a bottom plate, a slide rail fixed on a top surface of the bottom plate, a tank body slidably connected to the slide rail, and baffles fixed at both ends of the bottom plate; the tank body is internally provided with a plurality of circumferentially distributed curved panels; and there are a plurality of circumferentially distributed disturbance components in the disturbance space.

9 Claims, 7 Drawing Sheets

(51) Int. Cl.
*A22B 7/00* (2006.01)
*B09B 3/38* (2022.01)
*B09B 101/70* (2022.01)

(56) References Cited

U.S. PATENT DOCUMENTS

| | | | |
|---|---|---|---|
| 9,497,985 B2 * | 11/2016 | Garwood | ................ A22C 17/04 |
| 2003/0054546 A1 | 3/2003 | Petrecca | |
| 2013/0115349 A1 * | 5/2013 | Garwood | ................ A23L 13/60 |
| | | | 426/417 |
| 2020/0029583 A1 * | 1/2020 | Garwood | ................ A22C 17/08 |

FOREIGN PATENT DOCUMENTS

| | | |
|---|---|---|
| CN | 210115038 U | 2/2020 |
| CN | 211199234 U | 8/2020 |
| CN | 211972286 U | 11/2020 |
| CN | 212800389 U | 3/2021 |
| CN | 112656008 A | 4/2021 |
| CN | 213475941 U | 6/2021 |
| CN | 113426353 A | 9/2021 |
| CN | 215328096 U | 12/2021 |
| CN | 215389051 U | 1/2022 |
| CN | 215876540 U | 2/2022 |
| DE | 3902620 A1 | 8/1989 |
| KR | 101733628 B1 | 5/2017 |

* cited by examiner

ENZYMATIC HYDROLYSIS DEVICE FOR LIVESTOCK AND POULTRY SLAUGHTER BY-PRODUCTS

CROSS-REFERENCE TO RELATED APPLICATIONS

This application claims priority to Chinese Patent Application No. 202210216976.7, filed on Mar. 7, 2022, the contents of which are hereby incorporated by reference.

TECHNICAL FIELD

The application relates to the technical field of equipment for livestock and poultry slaughter industry, and in particular to an enzymatic hydrolysis device for livestock and poultry slaughter by-products.

BACKGROUND

Livestock and poultry meat is the most important source of high nutrition food for human beings, and is mainly obtained by livestock and poultry slaughtering. A large number of livestock and poultry slaughter by-products are produced during the livestock and poultry slaughtering, especially for internal organs of livestock and poultry, such as livers, lungs, spleens, small intestines. Some livestock and poultry slaughter by-products are difficult to be made into food products. If these by-products are directly discarded without high-valued application, the environmental pollution would be probably generated, which subsequently impact the living environment of human beings. It is well known that protein is a primary component of livestock and poultry slaughter by-products, which probably accounted for about 45% of the total weight. Moreover, when hydrolysis is carried out to hydrolyse the livestock and poultry slaughter by-products, the biological activity of the related hydrolysate is greatly improved after the enzymatic hydrolysis, thus solving an environmental pollution, and generating additional economic benefits. The enzymatic hydrolysis of livestock and poultry slaughter by-products by adding protease is a common enzymatic hydrolysis method in protein.

At present, crushing and stirring devices are widely used for the enzymatic hydrolysis of livestock and poultry slaughter by-products. The livestock and poultry slaughter by-products are preliminarily broken by stirring mechanisms set in the devices, such as stirring shafts connected with stirring blades and cutters on the stirring blades. Alternatively, the livestock and poultry slaughter by-products are preliminarily broken before being sent into the devices After that, a mixed solution of protease and water is added during the stirring of the livestock and poultry slaughter by-products for the enzymatic hydrolysis. However, a lot of residues may accumulate at bottoms of the devices after the livestock and poultry slaughter by-products are broken, resulting in a poor mixing effect with the mixed solution, so that a large amount of the residues are accumulated in finally sent materials. Therefore, a quality of the treated materials is poor and an efficiency of the enzymatic hydrolysis is low.

SUMMARY

An objective of the application is to provide an enzymatic hydrolysis device for livestock and poultry slaughter by-products, in order to solve the problems existing in the prior art, crush and disturb the livestock and poultry slaughter by-products for many times, improve a quality of treated materials, and greatly improve an enzymatic hydrolysis efficiency.

To achieve the above objective, the application provides a following scheme: the application provides the enzymatic hydrolysis device for the livestock and poultry slaughter by-products, including:

a liquid injection crushing mechanism; the liquid injection crushing mechanism includes a feeding barrel, a crushing box is fixed and communicated with a bottom end of the feeding barrel; two symmetrically arranged rolling plates are arranged in the feeding barrel, and a rolling space is arranged between the two rolling plates; a bottom of the rolling space is provided with a bearing plate, and the bearing plate is movably arranged at a joint of the feeding barrel and the crushing box; an air pump is fixed at a bottom of the crushing box, and an output end of the air pump is communicated with the crushing box; a first partition is fixed in the crushing box, a rotating rod penetrates through a center of the first partition, and the rotating rod is rotatably connected with the first partition; a spiral blade is fixed at a part of the rotating rod at a top of the first partition, a plurality of through holes are formed through the first partition, and waterproof breathable films are embedded in the through holes; any side wall of the crushing box is fixedly connected with a liquid injection pipe, and the side wall of the crushing box opposite to the liquid injection pipe is fixedly connected and communicated with a first discharge pipe; both the first discharge pipe and the liquid injection pipe are located at the top of the first partition, and a booster pump is installed on the first discharge pipe;

a mixing disturbance mechanism; the mixing disturbance mechanism includes a bottom plate, a slide rail fixed on a top surface of the bottom plate, a tank body slidably connected to the slide rail, baffles fixed at both ends of the bottom plate, a plurality of support springs fixedly connected between any baffle and the tank body, a first telescopic cylinder fixed to the other baffle, and a push plate fixed at an output end of the first telescopic cylinder; the push plate is fixedly connected with one end of the tank body far away from the support springs; the tank body is internally provided with a plurality of circumferentially distributed curved panels, and the curved panels are embedded with the heating wires; the curved panels abut each other, and a disturbance space is enclosed among the curved panels; there are a plurality of circumferentially distributed disturbance components in the disturbance space, and a central shaft is arranged among the disturbance components; the disturbance components include a plurality of first stirring blades, and a plurality of second stirring blades are fixed on a surface of the central shaft, and each second stirring blade is located between two adjacent first stirring blades; the first discharge pipe is communicated with one end of the disturbance space, and the other end of the disturbance space is communicated with a second discharge pipe; and a material collecting mechanism; the material collecting mechanism is used for receiving materials sent by the second discharge pipe.

In an embodiment, second telescopic cylinders are respectively fixed at both ends of an inner side of the feeding barrel, output ends of the two second telescopic cylinders are oppositely arranged, and the two rolling plates are respectively fixed at the output ends of the two second telescopic cylinders; a top surface of the bearing plate is provided with two symmetrically arranged inclined planes, a highest point of the inclined planes is located at a center of the top surface of the bearing plate, and the two inclined planes make a transition through a rounded corner; brushes are fixed at bottoms of the rolling plates, and the brushes abut against the inclined planes; a plurality of vibration motors are fixed at corners of a bottom surface of the bearing plate, and the plurality of vibration motors are fixed on a top surface of a bearing platform, and a bottom surface of the bearing platform is fixed with an output end of a third telescopic cylinder; the third telescopic cylinder is fixed in the crushing box by a support beam, and the third telescopic cylinder is located on a top of the rotating rod.

In an embodiment, the bottom of the crushing box is fixed with a bracket, the output end of the air pump is fixedly connected and communicated with a gas injection pipe, the gas injection pipe extends from the bottom of the crushing box, a second partition is fixed in the crushing box, the second partition is located at a bottom of the first partition, and the bottom inside the crushing box is fixed with a heat insulation shell and a plurality of heating columns; the heat insulation shell, the heating columns and the gas injection pipe are all located at a bottom of the second partition; a first motor is fixed in the heat insulation shell, and an output shaft of the first motor is fixed with the rotating rod, and the rotating rod passes through the second partition and the first partition in turn; a plurality of gas injection nozzles are fixed on a top surface of the second partition, and input ends of the gas injection nozzles are provided with first solenoid valves, and the input ends of the gas injection nozzles are communicated with a space at the bottom of the second partition.

In an embodiment, the first partition is arranged obliquely, a highest point of the first partition is located on the same side as the liquid injection pipe, a lowest point of the first partition is located on the same side as the first discharge pipe, a second solenoid valve is installed at a feed end of the first discharge pipe, and the gas injection nozzles are in one-to-one correspondence with the waterproof breathable films.

In an embodiment, the disturbance components include inner rods; one end of each inner rod is fixedly connected with an output shaft of each second motor, and the other end of each inner rod is axially connected with the tank body; one end of the central shaft is fixedly connected with an output shaft of a third motor, and the other end of the central shaft is axially connected with the tank body; the second motors and the third motor are fixed on an outer side of the tank body; each outer cylinder is sleeved on an outer side of each inner rod, and the plurality of first stirring blades are fixed on the outer side of each outer cylinder; two ends of each inner rod are pierced with annular plates, one end of each annular plate abuts against an end face of each outer cylinder, and a plurality of damping springs are fixed between the other end of each annular plate and an end face of the tank body; a plurality of cylinders are fixed on an inner side of each outer cylinder, and limiting columns are slidably connected in the cylinders; each limiting spring is fixed between one end of each limiting column and each cylinder, and each spherical protrusion is fixed on the other end of each limiting column; a surface of each inner rod is provided with a plurality of limiting grooves, and magnet blocks are fixed in the limiting grooves; the spherical protrusions extend into the limiting grooves and attract with the magnet blocks; two ends of each limiting groove are respectively provided with a limiting plate, and each limiting plate is fixed on the surface of each inner rod.

In an embodiment, a plurality of gantries are circumferentially fixed on the outer side of the tank body, and fourth telescopic cylinders are fixed on the gantries; each output end of each fourth telescopic cylinder is fixed with each fixed beam, and the end of each fixed beam far from each fourth telescopic cylinder is fixed with a plurality of movable rods; the plurality of movable rods penetrate through a side wall of the tank body and are fixedly connected with outer sides of the curved panels.

In an embodiment, the baffle fixed with the support springs is internally provided with an aggregate cavity, one end of the aggregate cavity is fixedly connected and communicated with the first discharge pipe, and the other end of the aggregate cavity is communicated with a plurality of hoses, and the hoses are provided with a plurality of bent sections; output ends of the hoses penetrate through the end face of the tank body and are provided with third solenoid valves, and the third solenoid valves face gaps between the curved panels and the outer cylinders and the gaps between the outer cylinders and the central shaft.

In an embodiment, the baffle fixed with the first telescopic cylinder is provided with a plurality of circumferentially arranged connecting pipes, one end of each connecting pipe passes through the push plate and the end face of the tank body in turn and is installed with a fourth solenoid valve; the fourth solenoid valves face the gaps between the curved panels and the outer cylinders; rubber sleeves are embedded in the push plate, and the connecting pipes abut against inner sides of the rubber sleeves; and the other ends of the plurality of connecting pipes are all communicated with an aggregate pipe, and the aggregate pipe is fixedly connected and communicated with the second discharge pipe.

In an embodiment, a plurality of mounting brackets are fixed at a bottom of the tank body, and the mounting brackets are rotatably connected with wheels, and the wheels are slidably connected to the slide rail.

In an embodiment, the material collecting mechanism includes a plurality of collecting tanks arranged side by side, and the collecting tanks are all communicated with the second discharge pipe, and tops of the collecting tanks are provided with exhaust valves.

The application discloses following technical effects: firstly, the livestock and poultry slaughter by-products are directly fed into the feeding barrel, and then fall on the bearing plate, and are located in the rolling space between two rolling plates; the two rolling plates move to the center of the feeding barrel at the same time and push the livestock and poultry slaughter by-products to gather; the livestock and poultry slaughter by-products may be crushed and damaged when the two rolling plates are closed, and one part is formed into small blocks, and the other part is extruded into sheets; the two rolling plates are reset and the bearing plate moves downwards to send the crushed livestock and poultry slaughter by-products into the crushing box, and a mixed solution of protease and water is injected into the crushing box by the liquid injection pipe; the rotating rod drives the spiral blade to rotate, so that the sheets may be cut into small blocks; in the space above the first partition, the livestock and poultry slaughter by-products are stirred and mixed with the mixed solution; in order to prevent some small blocks of the livestock and poultry slaughter by-products from accumulating on the first partition, compressed air input by the air pump is sent out from the through holes of the first partition, so that the small blocks of the livestock and poultry slaughter by-products accumulated on the top surface of the first partition go upward and continue to be crushed and stirred to form preliminary mixed materials; the waterproof breathable films may ensure that the mixed materials do not fall into the space below the first partition, and the booster pump provides a power to send the mixed materials to the mixing disturbance mechanism through the first discharge pipe; before the mixed materials enter the tank body, the plurality of curved panels gather toward the center of the tank body, so that the curved panels abut against each other and enclose the disturbance space; after the mixed materials enter the disturbance space, the disturbance components and the central shaft rotate simultaneously, respectively driving the first stirring blades and the second stirring blades to rotate and hit the mixed materials, so that on the one hand, the mixed materials may be disturbed for the second time, and on the other hand, block materials may be broken again by a hitting of the stirring blades; during the disturbance, the first telescopic cylinder drives the tank body to reciprocate along the slide rail, so that the mixed materials in the tank body may keep flowing, preventing small particles of impurities from piling up again; at the same time, a reaction force may be provided to the movement of the tank body under an action of the support springs, so as to give the tank body an exciting force, and ensure that the tank body does not directly collide with the baffles; the materials are fully disturbed and mixed as a whole, and finally, the materials are sent to the material collecting mechanism through the second discharge pipe for collection. With an overall structure according to the application, the livestock and poultry slaughter by-products are crushed and disturbed for many times, so that the quality of the treated materials is improved, and the enzymatic hydrolysis efficiency is greatly improved.

BRIEF DESCRIPTION OF THE DRAWINGS

In order to more clearly explain embodiments of the application or technical solutions in the prior art, the following briefly introduces drawings that need to be used in the embodiments. Obviously, the drawings in the following description are only some embodiments of the application. For those of ordinary skill in the art, other drawings may be obtained according to these drawings without any creative efforts.

DETAILED DESCRIPTION OF THE EMBODIMENTS

Technical solutions in embodiments of the application are clearly and completely described below with reference to drawings in the embodiments of the application. Obviously, the described embodiments are only part of the embodiments of the application, but not all of them. Based on the embodiment of the application, all other embodiments obtained by ordinary technicians in the field without creative labour are within a scope of the application.

In order to make the above objects, features and advantages of the application more obvious and understandable, the application are explained in further detail below with reference to the drawings and detailed description.

Figure 1:
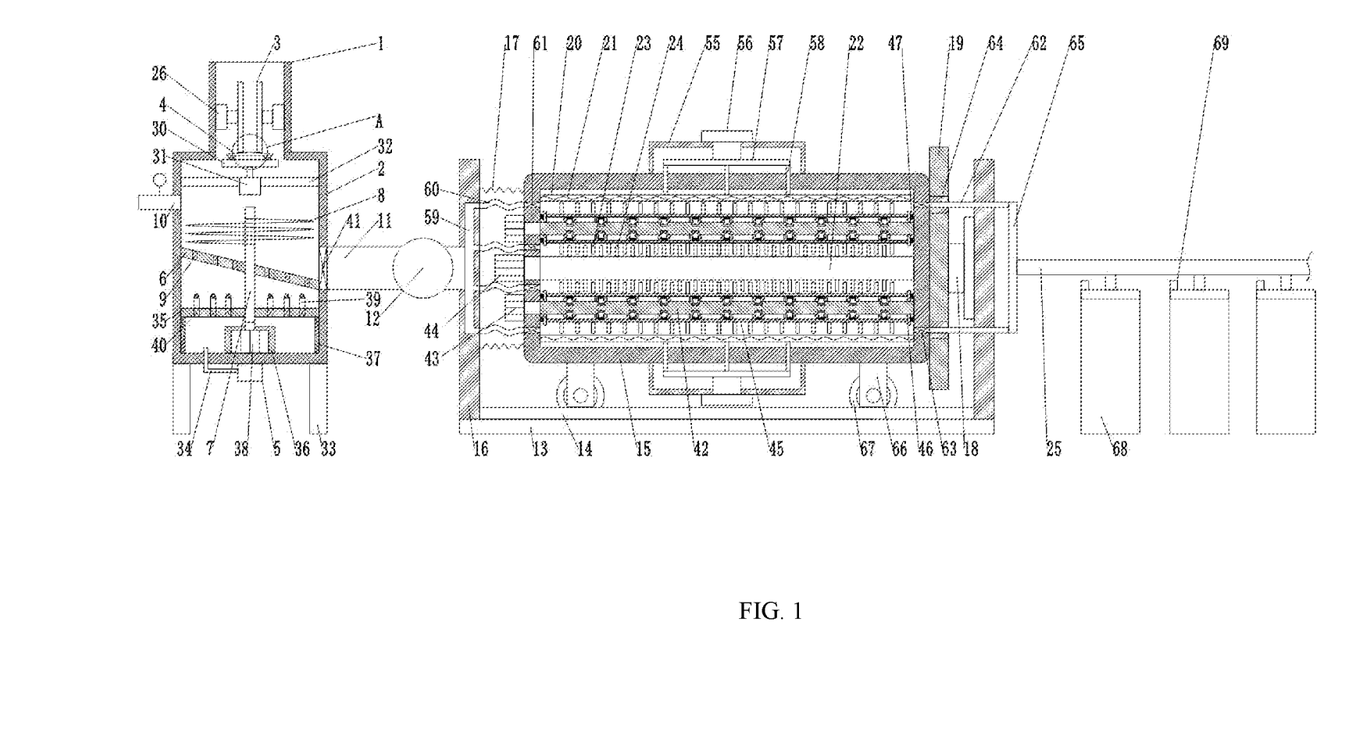
FIG. 1 is a schematic structural diagram of an enzymatic hydrolysis device for livestock and poultry slaughter by-products.
Figure 3:
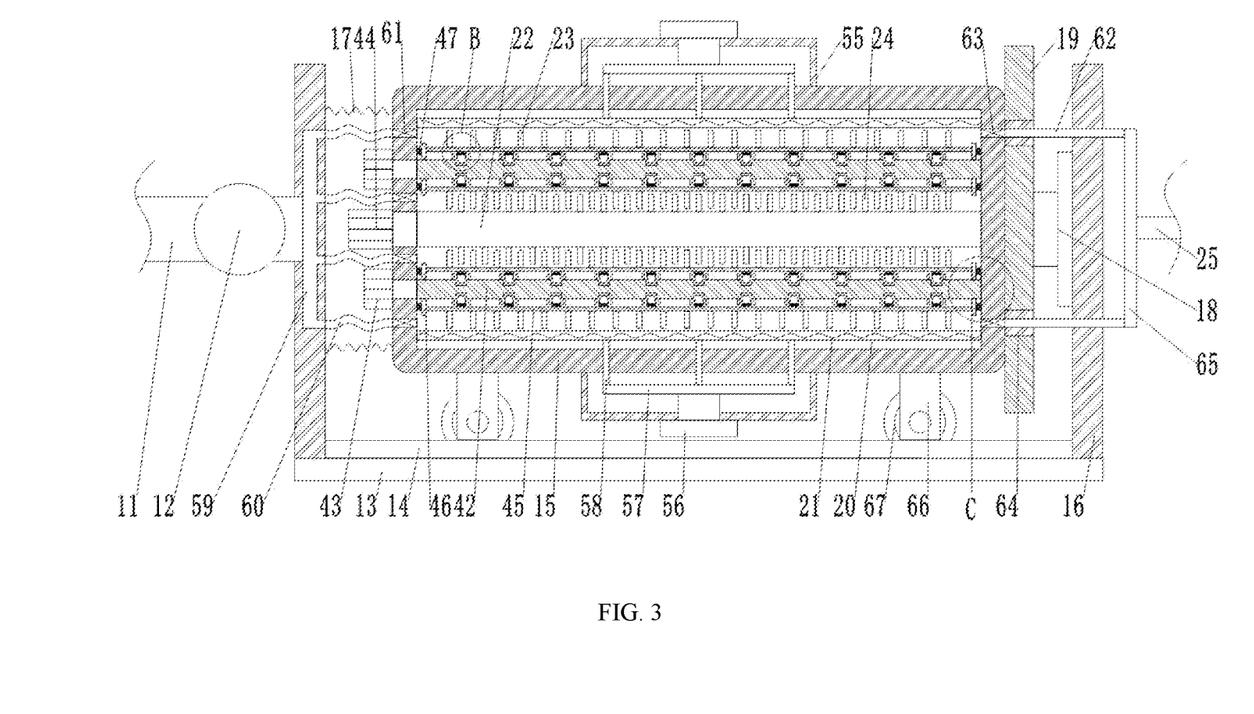
FIG. 3 is a schematic structural diagram of a hybrid disturbance mechanism according to the application.
Figure 4:
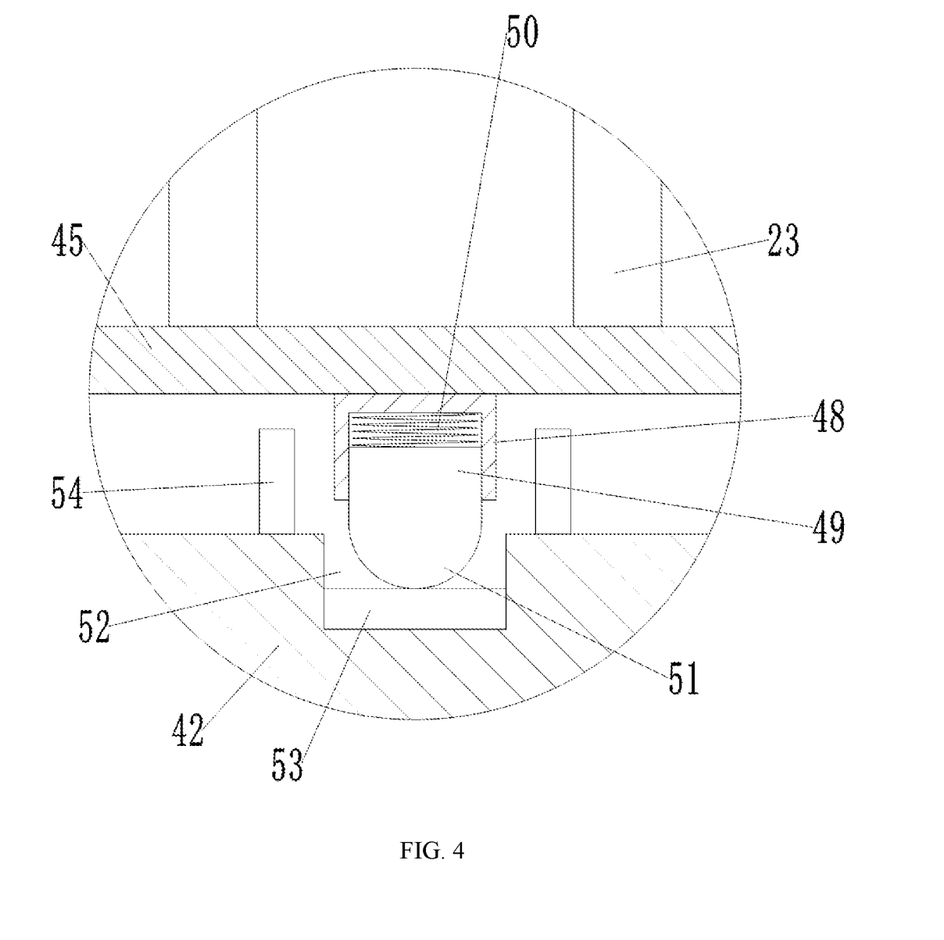
FIG. 4 is a partial enlarged view of B in FIG. 3.
Figure 5:
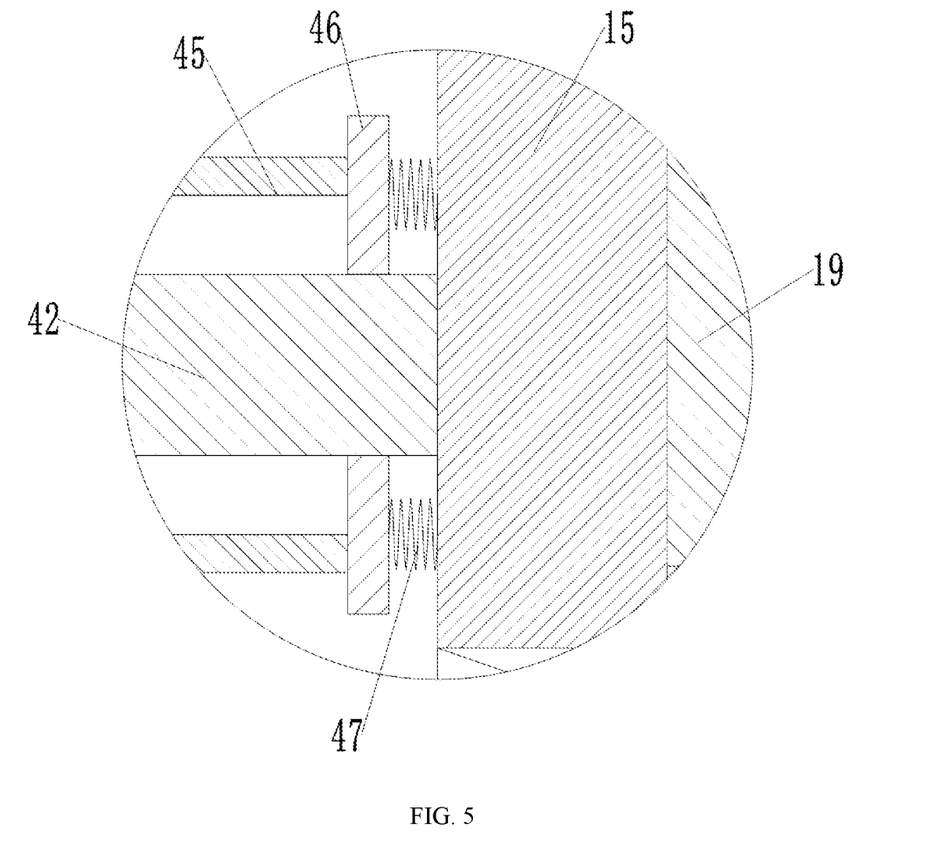
FIG. 5 is a partial enlarged view of C in FIG. 3.
Figure 6:
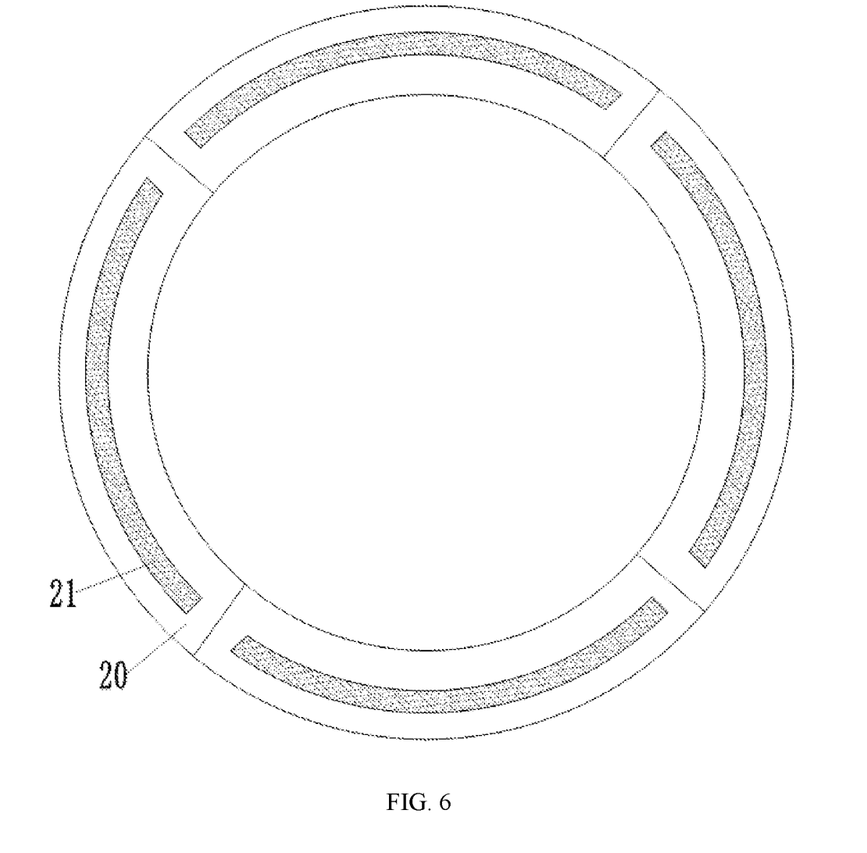
FIG. 6 is a side view of a disturbance space according to the application.

With reference to FIG. 1 and FIG. 3, the application provides an enzymatic hydrolysis device for livestock and poultry slaughter by-products, belonging to high-end equipment for a protein enzymatic hydrolysis of the livestock and poultry slaughter by-products, and a specific structure of the device includes:

a liquid injection crushing mechanism; the liquid injection crushing mechanism includes a feeding barrel 1, a crushing box 2 is fixed and communicated with a bottom end of the feeding barrel 1, and the feeding barrel 1 and the crushing box 2 are integrally formed; two symmetrically arranged rolling plates 3 are arranged in the feeding barrel 1, and a rolling space is arranged between the two rolling plates 3; each rolling plates 3 has a long side and two short sides fixed on both sides of the long side; the long side of any rolling plate 3 is wider than the long side of the other rolling plate 3, and the two sides of the wider long side of the rolling plate 3 are provided with insertion holes; when the two rolling plates 3 are butted, the two shorter short sides of the rolling plate 3 are inserted into the insertion holes, so that the rolling space is enclosed between the two rolling plates 3; when the two rolling plates 3 move to a center of the feeding barrel 1, the two shorter short sides of the rolling plate 3 move forward along the insertion holes until the long sides of the two rolling plates 3 are butted, so that the livestock and poultry slaughter by-products may be crushed; a bottom of the rolling space is provided with a bearing plate 4, and the bearing plate 4 is movably arranged at a joint of the feeding barrel 1 and the crushing box 2; the livestock and poultry slaughter by-products fed into the feeding barrel 1 first fall on a top surface of the bearing plate 4 and are located in the rolling space; when a work of the rolling plates 3 is completed, the bearing plate 4 descends and is fed into the crushing box 2; an air pump 5 is fixed at a bottom of the crushing box 2, and an output end of the air pump 5 is communicated with the crushing box 2; a first partition 6 is fixed in the crushing box 2, a rotating rod 7 penetrates through a center of the first partition 6, and the rotating rod 7 is rotatably connected with the first partition 6; a spiral blade 8 is fixed at a part of the rotating rod 7 at a top of the first partition 6, a plurality of through holes are formed through the first partition 6, and waterproof breathable films 9 are embedded in the through holes; any side wall of the crushing box 2 is fixedly connected with a liquid injection pipe 10, and the side wall of the crushing box 2 opposite to the liquid injection pipe 10 is fixedly connected and communicated with a first discharge pipe 11; both the first discharge pipe 11 and the liquid injection pipe 10 are located at the top of the first partition 6, and a booster pump 12 is installed on the first discharge pipe 11; the liquid injection pipe 10 injects a mixed solution of protease and water into the crushing box 2, and the rotating rod 7 drives the spiral blade 8 to rotate, so that sheets may be cut into small blocks; the livestock and poultry slaughter by-products are stirred and mixed with the mixed solution in the space above the first partition 6; in order to prevent some small blocks of the livestock and poultry slaughter by-products from accumulating on the first partition 6, compressed air input by the air pump 5 is sent out from the through holes of the first partition 6, so that the small blocks of livestock and poultry slaughter by-products accumulated on the top surface of the first partition 6 go upward and continue to be crushed and stirred to form preliminary mixed materials; the waterproof breathable films 9 may ensure that the mixed materials do not fall into the space below the first partition 6, and the booster pump 12 provides a power to send the mixed materials to a mixing disturbance mechanism through the first discharge pipe 11;

the mixing disturbance mechanism; the mixing disturbance mechanism includes a bottom plate 13, a slide rail 14 fixed on a top surface of the bottom plate 13, a tank body 15 slidably connected to the slide rail 14, baffles 16 fixed at both ends of the bottom plate 13, a plurality of support springs 17 fixedly connected between any baffle 16 and the tank body 15, a first telescopic cylinder 18 fixed to the other baffle 16, and a push plate 19 fixed at an output end of the first telescopic cylinder 18; the push plate 19 is fixedly connected with one end of the tank body 15 far away from the support springs 17; during a disturbance inside the tank body 15, the first telescopic cylinder 18 drives the tank body 15 to reciprocate along the slide rail 14, so that the mixed materials in the tank body 15 may keep flowing, and small particles of impurities may be prevented from accumulating again; at the same time, a reaction force to a movement of the tank body 15 may be provided under an action of the support springs 17, so as to give an exciting force to the tank body 15 and ensure that the tank body 15 may not directly collide with the baffles 16; the tank body 15 is internally provided with a plurality of circumferentially distributed curved panels 20, and the curved panels 20 are embedded with the heating wires 21; the curved panels 20 abut each other, and a disturbance space is enclosed among the curved panels 20; there are a plurality of circumferentially distributed disturbance components in the disturbance space, and a central shaft 22 is arranged among the disturbance components; the disturbance components include a plurality of first stirring blades 23, and a plurality of second stirring blades 24 are fixed on a surface of the central shaft 22, and each second stirring blade 24 is located between two adjacent first stirring blades 23; the first discharge pipe 11 is communicated with one end of the disturbance space, and the other end of the disturbance space is communicated with a second discharge pipe 25; before the mixed materials enter the tank body 15, the plurality of curved panels 20 gather toward a center of the tank body 15, so that the curved panels 20 abut against each other and enclose the disturbance space; after the mixed materials enter the disturbance space, the disturbance components and the central shaft 22 rotate simultaneously, respectively driving the first stirring blades 23 and the second stirring blades 24 to rotate and hit the mixed materials, and fully mixing the materials with an external disturbance; and a material collecting mechanism used for receiving the materials sent by the second discharge pipe 25.

Firstly, the livestock and poultry slaughter by-products are directly fed into the feeding barrel 1, and then fall on the bearing plate 4, and are located in the rolling space between two rolling plates 3; the two rolling plates 3 move to the center of the feeding barrel 1 at the same time and push the livestock and poultry slaughter by-products to gather; the livestock and poultry slaughter by-products may be crushed and damaged when the two rolling plates 3 are closed, and one part is formed into small blocks, and the other part is extruded into sheets; the two rolling plates 3 are reset and the bearing plate 4 moves downwards to send the crushed livestock and poultry slaughter by-products into the crushing box 2, and the mixed solution of protease and water is injected into the crushing box 2 by the liquid injection pipe 10; the rotating rod 7 drives the spiral blade 8 to rotate, so that the sheets may be cut into small blocks; in the space above the first partition 6, the livestock and poultry slaughter by-products are stirred and mixed with the mixed solution; in order to prevent some small blocks of the livestock and poultry slaughter by-products from accumulating on the first partition 6, the compressed air input by the air pump 5 is sent out from the through holes of the first partition 6, so that the small blocks of the livestock and poultry slaughter by-products accumulated on the top surface of the first partition 6 go upward and continue to be crushed and stirred to form the preliminary mixed materials; the waterproof breathable films 9 may ensure that the mixed materials do not fall into the space below the first partition 6, and the booster pump 12 provides the power to send the mixed materials to the mixing disturbance mechanism through the first discharge pipe 11; before the mixed materials enter the tank body 15, the plurality of curved panels 20 gather toward the center of the tank body 15, so that the curved panels 20 abut against each other and enclose the disturbance space; after the mixed materials enter the disturbance space, the disturbance components and the central shaft 22 rotate simultaneously, respectively driving the first stirring blades 23 and the second stirring blades 24 to rotate and hit the mixed materials, so that on the one hand, the mixed materials may be disturbed for the second time, and on the other hand, block materials may be broken again by a hitting of the stirring blades; during the disturbance, the first telescopic cylinder 18 drives the tank body 15 to reciprocate along the slide rail 14, so that the mixed materials in the tank body 15 may keep flowing, preventing the small particles of impurities from piling up again; at the same time, the reaction force may be provided to the movement of the tank body 15 under the action of the support springs 17, so as to give the tank body 15 the exciting force, and ensure that the tank body 15 does not directly collide with the baffles 16; the materials are fully disturbed and mixed as a whole, and finally, the materials are sent to the material collecting mechanism through the second discharge pipe 25 for collection.

Embodiment 1

Figure 2:
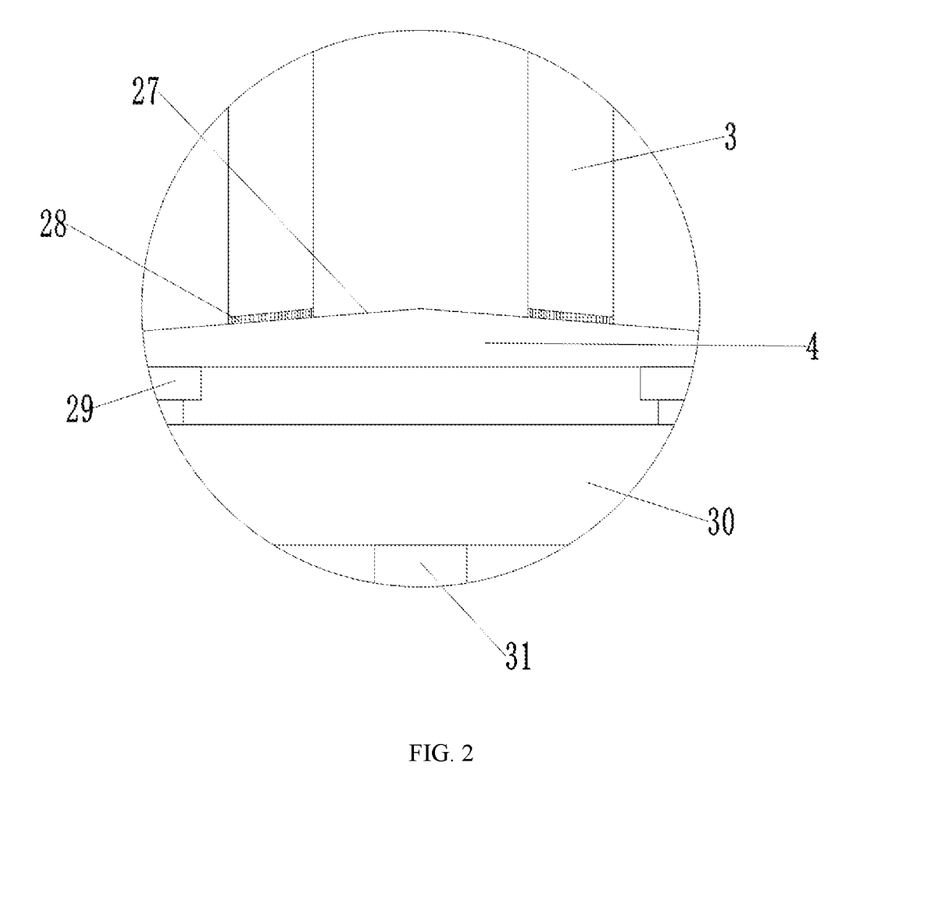
FIG. 2 is a partial enlarged view of A in FIG. 1.

With reference to FIGS. 1-2, this embodiment provides a specific internal structure of the liquid injection crushing mechanism. Two second telescopic cylinders 26 are respectively fixed at both ends of an inner side of the feeding barrel 1, output ends of the two second telescopic cylinders 26 are oppositely arranged, the two rolling plates 3 are respectively fixed at the output ends of the two second telescopic cylinders 26, and the second telescopic cylinders 26 are used as driving parts to drive the two rolling plates 3 to move oppositely. The top surface of the bearing plate 4 is provided with two symmetrically arranged inclined planes 27, a highest point of the inclined planes 27 is located at the center of the top surface of the bearing plate 4, and the two inclined planes 27 make a transition through a rounded corner. Brushes 28 are fixed at bottoms of the rolling plates 3, and the brushes 28 abut against the inclined planes 27. A plurality of vibration motors 29 are fixed at the corners of a bottom surface of the bearing plate 4, and the plurality of vibration motors 29 are fixed on a top surface of a bearing platform 30, and a bottom surface of the bearing platform 30 is fixed with an output end of a third telescopic cylinder 31. The third telescopic cylinder 31 is fixed in the crushing box 2 by a support beam 32, and the third telescopic cylinder 31 is located on the top of the rotating rod 7. The third telescopic cylinder 31 is erected inside the crushing box 2 by the support beam 32, and the third telescopic cylinder 31 serves as the driving part of the bearing platform 30. When the third telescopic cylinder 31 drives the bearing platform 30 to rise, the bearing plate 4 ascends and abuts against bottom surfaces of the brushes 28 at the bottoms of the two rolling plates 3, so that the rolling space is a closed area. When the livestock and poultry slaughter by-products enter the rolling space, the livestock and poultry slaughter by-products move along the inclined planes 27 through the rolling plates 3 and are crushed and damaged. The rolling plates 3 retract after the livestock and poultry slaughter by-products are damaged, and the damaged livestock and poultry slaughter by-products descend along the inclined planes 27 and naturally slide into the crushing box 2 during a retraction process. When the two rolling plates 3 subsequently move to the center again, the brushes 28 at the bottoms of the two rolling plates 3 may clean up residues on the inclined planes 27 and crush the newly added livestock and poultry slaughter by-products again, so as to improve an initial crushing efficiency.

In an embodiment, a bottom end of the crushing box 2 is fixed with a bracket 33, the crushing box 2 is erected on a ground through the bracket 33, an output end of the air pump 5 is fixedly connected and communicated with a gas injection pipe 34, the gas injection pipe 34 extends from the bottom end of the crushing box 2, a second partition 35 is fixed in the crushing box 2, the second partition 35 is located at the bottom of the first partition 6, and the bottom end inside the crushing box 2 is fixed with a heat insulation shell 36 and a plurality of heating columns 37. The heat insulation shell 36, the heating columns 37 and the gas injection pipe 34 are all located at the bottom of the second partition 35. A first motor 38 is fixed in the heat insulation shell 36, and an output shaft of the first motor 38 is fixed with the rotating rod 7, and the rotating rod 7 passes through the second partition 35 and the first partition 6 in turn. The first motor 38, as the driving part of the rotating rod 7, drives the rotating rod 7 to rotate and stir and crush. A plurality of gas injection nozzles 39 are fixed on the top surface of the second partition 35, and input ends of the gas injection nozzles 39 are provided with first solenoid valves 40, and the input ends of the gas injection nozzles 39 are communicated with the space at the bottom of the second partition 35. A closed area is formed between the second partition 35 and the bottom of the crushing box 2. After the air pump 5 inputs the gas into the closed area, the heating columns 37 start to work to heat the gas in the closed area. Meanwhile, the heat insulation shell 36 is designed to prevent the first motor 38 in the closed area from overheating. When the gas in the closed area is heated to a predetermined temperature, the first solenoid valves 40 are turned on to introduce the heated gas into the area above the second partition 35, and the heated gas is output by the waterproof breathable films 9, so as to ensure that a stable constant temperature environment is provided for the protease in a stirring and crushing area.

In an embodiment, the first partition 6 is arranged obliquely, a highest point of the first partition 6 is located on the same side as the liquid injection pipe 10, a lowest point of the first partition 6 is located on the same side as the first discharge pipe 11, a second solenoid valve 41 is installed at a feed end of the first discharge pipe 11, and the gas injection nozzles 39 are in one-to-one correspondence with the waterproof breathable films 9. In a process of stirring and crushing, some residues are accumulated on the top surface of the first partition 6, and one gas injection nozzle 39 corresponding to an accumulation point is turned on, and the residues are ejected upward through the waterproof breathable film 9. When it is necessary to output the materials, the second solenoid valve 41 is turned on, and the materials enter the first discharge pipe 11 from high to low. When the materials are accumulated at the lowest point of the first partition 6, one gas injection nozzle 39 is also used to blow the materials away.

Embodiment 2

With reference to FIGS. 3-6, this embodiment provides a concrete structure of the mixing disturbance mechanism, in which the disturbance components include inner rods 42; one end of each inner rod 42 is fixedly connected with an output shaft of each second motor 43, and the other end of each inner rod 42 is axially connected with the tank body 15; one end of the central shaft 22 is fixedly connected with an output shaft of a third motor 44, and the other end of the central shaft 22 is axially connected with the tank body 15. The second motors 43 and the third motor 44 are fixed on an outer side of the tank body 15, the second motors 43 and the third motor 44 act as the driving parts of the inner rods 42 and the central shaft 22 respectively to drive the inner rods 42 and the central shaft 22 to rotate. Each outer cylinder 45 is sleeved on an outer side of each inner rod 42, and the plurality of first stirring blades 23 are fixed on the outer side of each outer cylinder 45. Two ends of each inner rod 42 are pierced with annular plates 46, one end of each annular plate 46 abuts against an end face of each outer cylinder 45, and a plurality of damping springs 47 are fixed between the other end of each annular plate 46 and the end face of the tank body 15. A plurality of cylinders 48 are fixed on an inner side of each outer cylinder 45, and limiting columns 49 are slidably connected in the cylinders 48. Each limiting spring 50 is fixed between one end of each limiting column 49 and each cylinder 48, and each spherical protrusion 51 is fixed on the other end of each limiting column 49. The surface of each inner rod 42 is provided with a plurality of limiting grooves 52, and magnet blocks 53 are fixed in the limiting grooves 52. The spherical protrusions 51 may extend into the limiting grooves 52 and attract with the magnet blocks 53. In an initial state, the spherical protrusions 51 are attracted with the magnet blocks 53. Two ends of each limiting groove 52 are respectively provided with a limiting plate 54, and each limiting plate 54 is fixed on the surface of each inner rod 42. Both inside and outside the tank body 15 are provided with structures that provide the disturbance. Since the tank body 15 is in a reciprocating motion state, the inner outer cylinders 45 passively generate relative motions along the inner rods 42, so the inner rods 42 push the annular plates 46 to move during the motions. The annular plates 46 are prevented from directly hitting the inner end face of the tank body 15 under an action of the damping springs 47, and at the same time, the reaction force is provided to keep the outer cylinders 45 in motion. Meanwhile, during the movement of the outer cylinders 45, the spherical protrusions 51 are separated from the magnet blocks 53 and press the edges of the limiting grooves 52, so that the limiting springs 50 inside the cylinders 48 are compressed, so that the spherical protrusions 51 escape from the limiting grooves 52. The limiting plates 54 are arranged to provide a limit distance for the spherical protrusions 51 to slide and to prevent the inner rods 42 from being completely separated from the outer cylinders 45. This arrangement may ensure that the outer cylinders 45 may slide back and forth with a high frequency and a low stroke. The distances between the first stirring blades 23 and the second stirring blades 24 in the left and right directions are constantly changed, thus realizing a multi-frequency transverse striking of the materials. This motion mode also depends on the movement of the external tank body 15, so as to ensure that the spherical protrusions 51 may be separated from the magnet blocks 53.

In an embodiment, a plurality of gantries 55 are circumferentially fixed on the outer side of the tank body 15, and the fourth telescopic cylinders 56 are fixed on the gantries 55; each output end of each fourth telescopic cylinder 56 is fixed with each fixed beam 57, and the end of each fixed beam 57 far from each fourth telescopic cylinder 56 is fixed with a plurality of movable rods 58; the plurality of movable rods 58 penetrate through the side wall of the tank body 15 and are fixedly connected with the outer sides of the curved panels 20, and the fourth telescopic cylinders 56 are used as the driving parts of the curved panels 20. As transmission parts, the movable rods 58 may adjust the distances of the curved panels 20 relative to the inner center of the tank body 15, so that the disturbance space may be formed among the plurality of curved panels 20. When an internal structure of the tank body 15 needs to be cleaned or overhauled, the fourth telescopic cylinders 56 drive the curved panels 20 to retract, so that the space inside the tank body 15 is enough to support a cleaning work or an overhaul work.

In an embodiment, the baffle 16 fixed with the support springs 17 is internally provided with an aggregate cavity 59, one end of the aggregate cavity 59 is fixedly connected and communicated with the first discharge pipe 11, and the other end of the aggregate cavity 59 is communicated with a plurality of hoses 60, and the hoses 60 are provided with a plurality of bent sections. As the tank body 15 needs to reciprocate, the hoses 60 and the bent sections on surfaces of the hoses 60 are provided to ensure that the hoses 60 have an enough telescopic space and do not interfere with the movement of the tank body 15. Output ends of the hoses 60 penetrate through the end face of the tank body 15 and are provided with third solenoid valves 61, and the third solenoid valves 61 face gaps between the curved panels 20 and the outer cylinders 45 and the gaps between the outer cylinders 45 and the central shaft 22. The first discharge pipe 11 feeds the whole materials into the aggregate cavity 59 for diverting the materials through the plurality of hoses 60. Then, the materials are fed into the gaps between the curved panels 20 and the outer cylinders 45 and the gaps between the outer cylinders 45 and the central shaft 22, and directly fed into a core area of the disturbance space, so as to facilitate a direct disturbance of the materials.

In an embodiment, the baffle 16 fixed with the first telescopic cylinder 18 is provided with a plurality of circumferentially arranged connecting pipes 62, one end of each connecting pipe 62 passes through the push plate 19 and the end face of the tank body 15 in turn and is installed with a fourth solenoid valve 63. On the one hand, the connecting pipes 62 are used for conveying the materials, on the other hand, the connecting pipes 62 may be used as guide rods. The fourth solenoid valves 63 face the gaps between the curved panels 20 and the outer cylinders 45. Rubber sleeves 64 are embedded in the push plate 19, and the connecting pipes 62 abut against the inner sides of the rubber sleeves 64, and the rubber sleeves 64 may prevent friction damages. The other ends of the plurality of connecting pipes 62 are all communicated with an aggregate pipe 65, and the aggregate pipe 65 is fixedly connected and communicated with the second discharge pipe 25. The third solenoid valves 61 and the fourth solenoid valves 63 are closed to disturb the materials during the disturbance. After the disturbance, the solenoid valves are opened, and the materials are sent out from the second discharge pipe 25 under the action of the booster pump 12.

In an embodiment, a plurality of mounting brackets 66 are fixed at the bottom of the tank body 15, and the mounting brackets 66 are rotatably connected with wheels 67, and the wheels 67 are slidably connected to the slide rail 14. During a sliding process of the tank body 15, the wheels 67 at the bottom slide on the slide rail 14 to ensure a stability of reciprocating sliding.

Embodiment 3

With reference to FIG. 1, this embodiment provides a concrete structure of the material collecting mechanism. The material collecting mechanism includes a plurality of collecting tanks 68 arranged side by side, and the collecting tanks 68 are all communicated with the second discharge pipe 25. In addition, tops of the collecting tanks 68 are provided with exhaust valves 69, and the materials sent out by the second discharge pipe 25 are respectively sent into each collecting tank 68. As the materials are mixed with previously filled gas, the gas may be discharged by the exhaust valves 69.

Embodiment 4

Figure 7:
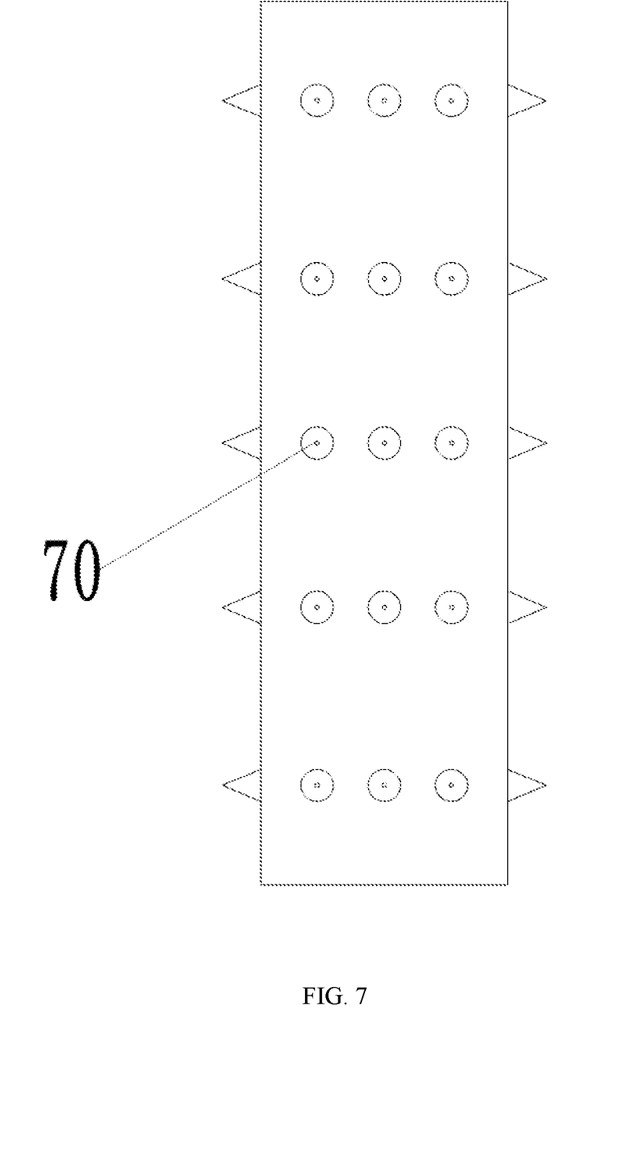
FIG. 7 is a schematic structural diagram of a first stirring blade and a second stirring blade according to the application.

With reference to FIG. 7, a difference from the above-mentioned embodiment 2 is that the end faces and side faces of the first stirring blades 23 and the second stirring blades 24 in this embodiment are fixed with a plurality of fixation pins 70, so as to further break the materials when striking the materials during the disturbance inside the tank body 15. Moreover, because the materials are mixed with the previously filled gas, a large number of bubbles are mixed in the materials, and the fixation pins 70 may play a role in removing the bubbles during the movement.

In the description of the application, it should be understood that terms "vertical", "horizontal", "top", "bottom", "front", "back", "left", "right", "vertical", "horizontal", "top", "bottom", "inside", "outside" and other directions or positional relationships indicated are based on directions or positional relationships shown in drawings, only for a convenience of describing the application, rather than indicating or implying that the device or element referred to must have a specific orientation, be constructed and operated in a specific orientation. Therefore, it cannot be understood as a limitation of the application.

The above-mentioned embodiments only describe preferred modes of the application, but do not limit the scope of the application. On a premise of not departing from a spirit of the application, all kinds of modifications and improvements made by ordinary technicians in the field to the technical scheme of the application shall fall within the scope of protection determined by claims of the application.

What is claimed is:

1. An enzymatic hydrolysis device for livestock and poultry slaughter by-products, comprising:
   a liquid injection crushing mechanism, wherein the liquid injection crushing mechanism comprises a feeding barrel, a crushing box is fixed and communicated with a bottom end of the feeding barrel; two symmetrically arranged rolling plates are arranged in the feeding barrel, and a rolling space is arranged between the two rolling plates; a bottom of the rolling space is provided with a bearing plate, and the bearing plate is movably arranged at a joint of the feeding barrel and the crushing box; an air pump is fixed at a bottom of the crushing box, and an output end of the air pump is communicated with the crushing box; a first partition is fixed in the crushing box, a rotating rod penetrates through a center of the first partition, and the rotating rod is rotatably connected with the first partition; a spiral blade is fixed at a part of the rotating rod at a top of the first partition, a plurality of through holes are formed through the first partition, and waterproof breathable films are embedded in the through holes; any side wall of the crushing box is fixedly connected with a liquid injection pipe, and the side wall of the crushing box opposite to the liquid injection pipe is fixedly connected and communicated with a first discharge pipe; both the first discharge pipe and the liquid injection pipe are located at the top of the first partition, and a booster pump is installed on the first discharge pipe;

a mixing disturbance mechanism, wherein the mixing disturbance mechanism comprises a bottom plate, a slide rail fixed on a top surface of the bottom plate, a tank body slidably connected to the slide rail, baffles fixed at both ends of the bottom plate, a plurality of support springs fixedly connected between any baffle and the tank body, a first telescopic cylinder fixed to the other baffle, and a push plate fixed at an output end of the first telescopic cylinder; the push plate is fixedly connected with one end of the tank body farther away from the support springs; the tank body is internally provided with a plurality of circumferentially distributed curved panels, and the curved panels are embedded with the heating wires; the curved panels abut each other, and a disturbance space is enclosed among the curved panels; there are a plurality of circumferentially distributed disturbance components in the disturbance space, and a central shaft is arranged among the disturbance components; the disturbance components comprise a plurality of first stirring blades, and a plurality of second stirring blades are fixed on a surface of the central shaft, and each second stirring blade is located between two adjacent first stirring blades; the first discharge pipe is communicated with one end of the disturbance space, and the other end of the disturbance space is communicated with a second discharge pipe; and a material collecting mechanism, wherein the material collecting mechanism is used for receiving materials sent by the second discharge pipe; and the disturbance components comprise inner rods; one end of each inner rod is fixedly connected with an output shaft of each second motor, and an other end of each inner rod is axially connected with the tank body; one end of the central shaft is fixedly connected with an output shaft of a third motor, and an other end of the central shaft is axially connected with the tank body; the second motors and the third motor are fixed on an outer side of the tank body; each outer cylinder is sleeved on an outer side of each inner rod, and the plurality of first stirring blades are fixed on an outer side of each outer cylinder; two ends of each inner rod are pierced with annular plates, one end of each annular plate abuts against an end face of each outer cylinder, and a plurality of damping springs are fixed between an other end of each annular plate and an end face of the tank body; a plurality of cylinders are fixed on an inner side of each outer cylinder, and limiting columns are slidably connected in the cylinders; each limiting spring is fixed between one end of each limiting column and each cylinder, and each spherical protrusion is fixed on an other end of each limiting column; a surface of each inner rod is provided with a plurality of limiting grooves, and magnet blocks are fixed in the limiting grooves; the spherical protrusions extend into the limiting grooves and attract with the magnet blocks; two ends of each limiting groove are respectively provided with a limiting plate, and each limiting plate is fixed on the surface of each inner rod.

2. The enzymatic hydrolysis device for the livestock and poultry slaughter by-products according to claim 1, wherein second telescopic cylinders are respectively fixed at both ends of an inner side of the feeding barrel, output ends of the two second telescopic cylinders are oppositely arranged, and the two rolling plates are respectively fixed at the output ends of the two second telescopic cylinders; a top surface of the bearing plate is provided with two symmetrically arranged inclined planes, a highest point of the inclined planes is located at a center of the top surface of the bearing plate, and the two inclined planes make a transition through a rounded corner; brushes are fixed at bottoms of the rolling plates, and the brushes abut against the inclined planes; a plurality of vibration motors are fixed at corners of a bottom surface of the bearing plate, and the plurality of vibration motors are fixed on a top surface of a bearing platform, and a bottom surface of the bearing platform is fixed with an output end of a third telescopic cylinder; the third telescopic cylinder is fixed in the crushing box by a support beam, and the third telescopic cylinder is located on a top of the rotating rod.

3. The enzymatic hydrolysis device for the livestock and poultry slaughter by-products according to claim 1, wherein the bottom of the crushing box is fixed with a bracket, the output end of the air pump is fixedly connected and communicated with a gas injection pipe, the gas injection pipe extends from the bottom of the crushing box, a second partition is fixed in the crushing box, the second partition is located at a bottom of the first partition, and a bottom inside the crushing box is fixed with a heat insulation shell and a plurality of heating columns; the heat insulation shell, the heating columns and the gas injection pipe are all located at a bottom of the second partition; a first motor is fixed in the heat insulation shell, and an output shaft of the first motor is fixed with the rotating rod, and the rotating rod passes through the second partition and the first partition in turn; a plurality of gas injection nozzles are fixed on a top surface of the second partition, and input ends of the gas injection nozzles are provided with first solenoid valves, and the input ends of the gas injection nozzles are communicated with a space at the bottom of the second partition.

4. The enzymatic hydrolysis device for the livestock and poultry slaughter by-products according to claim 3, wherein the first partition is arranged obliquely, a highest point of the first partition is located on a same side as the liquid injection pipe, a lowest point of the first partition is located on a same side as the first discharge pipe, a second solenoid valve is installed at a feed end of the first discharge pipe, and the gas injection nozzles are in one-to-one correspondence with the waterproof breathable films.

5. The enzymatic hydrolysis device for the livestock and poultry slaughter by-products according to claim 1, wherein a plurality of gantries are circumferentially fixed on an outer side of the tank body, and fourth telescopic cylinders are fixed on the gantries; each output end of each fourth telescopic cylinder is fixed with each fixed beam, and an end of each fixed beam farther from each fourth telescopic cylinder is fixed with a plurality of movable rods; the plurality of movable rods penetrate through a side wall of the tank body and are fixedly connected with outer sides of the curved panels.

6. The enzymatic hydrolysis device for the livestock and poultry slaughter by-products according to claim 1, wherein the baffle fixed with the support springs is internally provided with an aggregate cavity, one end of the aggregate cavity is fixedly connected and communicated with the first discharge pipe, and an other end of the aggregate cavity is communicated with a plurality of hoses, and the hoses are provided with a plurality of bent sections; output ends of the hoses penetrate through the end face of the tank body and are provided with third solenoid valves, and the third solenoid valves face gaps between the curved panels and the outer cylinders and gaps between the outer cylinders and the central shaft.

7. The enzymatic hydrolysis device for the livestock and poultry slaughter by-products according to claim 1, wherein the baffle fixed with the first telescopic cylinder is provided with a plurality of circumferentially arranged connecting pipes, one end of each connecting pipe passes through the push plate and the end face of the tank body in turn and is installed with a fourth solenoid valve; the fourth solenoid valves face the gaps between the curved panels and the outer cylinders; rubber sleeves are embedded in the push plate, and the connecting pipes abut against inner sides of the rubber sleeves; and other ends of the plurality of connecting pipes are all communicated with an aggregate pipe, and the aggregate pipe is fixedly connected and communicated with the second discharge pipe.

8. The enzymatic hydrolysis device for the livestock and poultry slaughter by-products according to claim 1, wherein a plurality of mounting brackets are fixed at a bottom of the tank body, and the mounting brackets are rotatably connected with wheels, and the wheels are slidably connected to the slide rail.

9. The enzymatic hydrolysis device for the livestock and poultry slaughter by-products according to claim 1, wherein the material collecting mechanism comprises a plurality of collecting tanks arranged side by side, and the collecting tanks are all communicated with the second discharge pipe, and tops of the collecting tanks are provided with exhaust valves.

* * * * *